Oct. 16, 1934.　　　　F. W. TROUP　　　　1,977,535
ELECTRICALLY OPERATED BRAKE
Original Filed May 10, 1932　　2 Sheets-Sheet 1

Inventor
Forrest W. Troup.

By Clarence A. O'Brien
Attorney

Oct. 16, 1934.  F. W. TROUP  1,977,535
ELECTRICALLY OPERATED BRAKE
Original Filed May 10, 1932    2 Sheets-Sheet 2

Inventor
Forrest W. Troup.
By Clarence A. O'Brien
Attorney

Patented Oct. 16, 1934

1,977,535

UNITED STATES PATENT OFFICE 1,977,535

ELECTRICALLY OPERATED BRAKE

Forrest W. Troup, Lake Village, Ind.

Application May 10, 1932, Serial No. 610,477
Renewed April 24, 1934

1 Claim. (Cl. 188—164)

This invention relates to an improved electromechanical brake which is especially, but not necessarily, adapted for use in the construction of present-day motor vehicles.

More specifically stated, the invention is predicated on a novel duplex brake shoe assembly embodying manually controllable electro-magnetic means for automatically drawing the shoes into braking contact with the brake drum together with spring-return means for releasing the brake shoes when the electro-magnets are de-energized.

The purpose of the invention is to provide a simple and expedient structural arrangement characterized by a novel unification and coordination of parts carefully selected and appropriately joined for promoting efficiency, dependability, and ease of operation.

Figure 2:
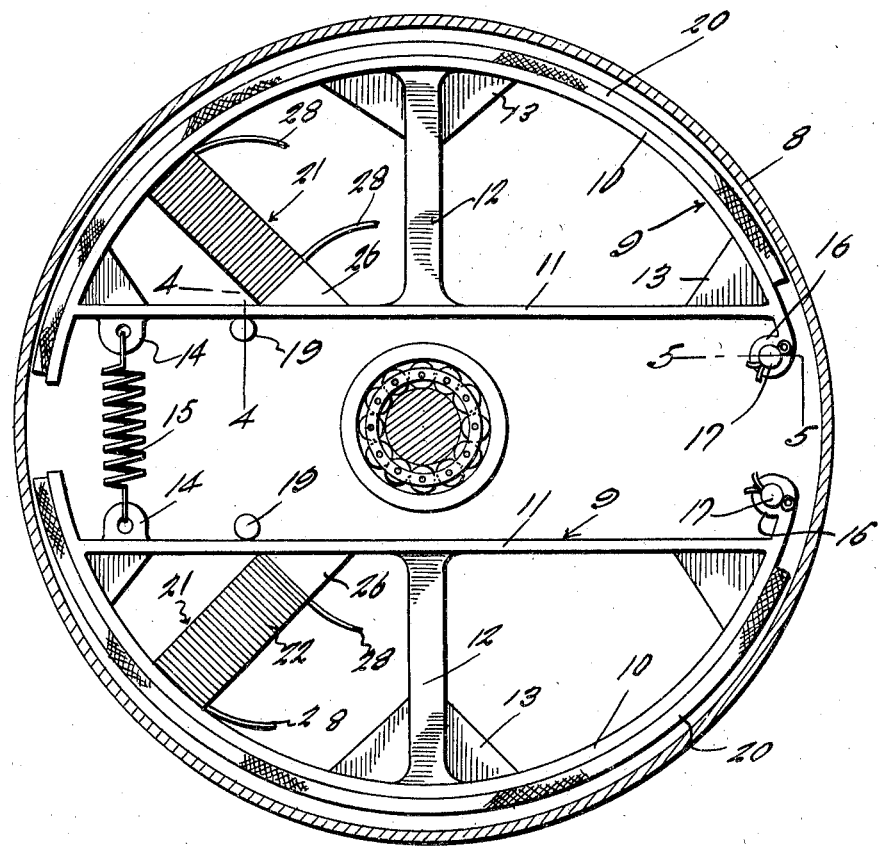
Figure 2 is a section taken approximately on the plane of the line 2—2 of Figure 1.

Figures 4 and 5 are detail sections taken on the plane of the lines 4—4 and 5—5 respectively of Figure 2.

Figure 1:
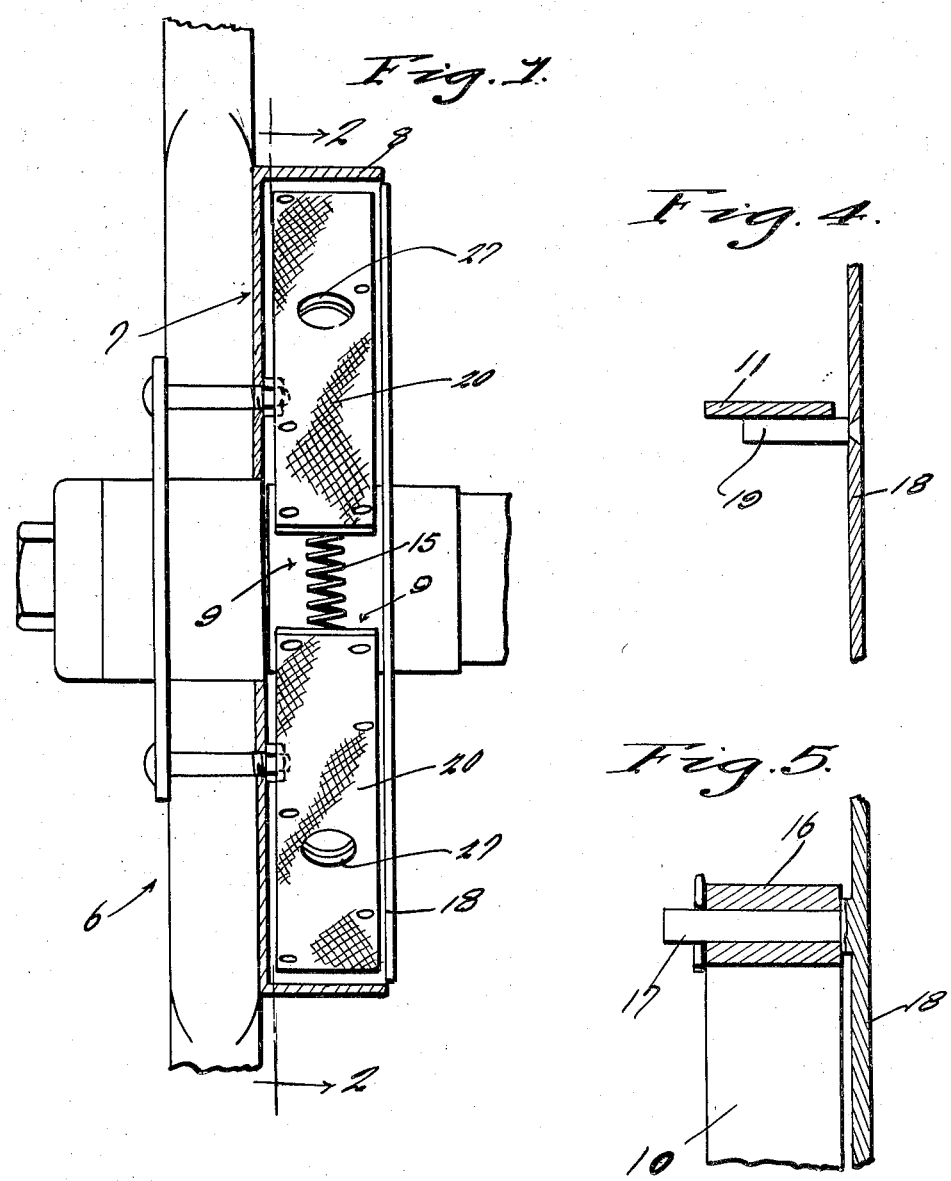
Figure 1 is a view in section and illustration illustrating the improved brake construction associated with the wheel and axle assembly.

In the drawings, in Figure 1, the wheel is denoted by the numeral 6 and the brake drum, which is fixed to the wheel, is represented by the numeral 7, the same being provided with the customary marginal brake surface flange 8.

Referring now to Figure 2, it will be seen that each brake shoe unit is distinguished by the numeral 9. These units are the same in construction and a description of one will suffice for both. The brake shoe proper is denoted by the numeral 10 and is of general semispherical configuration and this is provided with a longitudinal brace 11 and a transverse central brace 12 and appropriate reinforcing webs 13.

Likewise, at one end of the brace 11 is an apertured ear 14 to accommodate the return spring 15. At the opposite end of the unit the shoe is formed into a bearing 16 which is rockably mounted on the adjacent pintle stud 17, carried by the axle flange 18, as seen better in Figure 5.

The numerals 19 designate stop pins carried by said flange and located for co-operation with the braces 11 as seen in Figure 2. The brake band is distinguished by the numeral 20. The entire brake shoe unit is formed from brass in order to resist conduction of electro-magnetic forces from the electro-magnet 21 which forms a permanent part of the unit.

Figure 3:
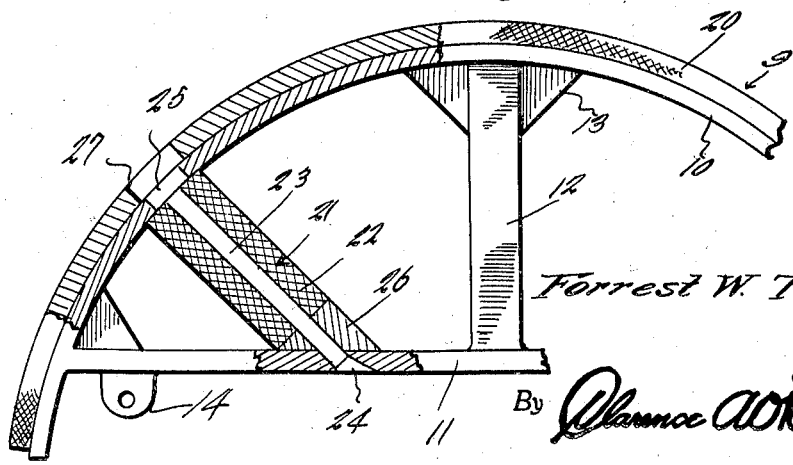
Figure 3 is a fragmentary detail sectional and elevational view, of one of the brake shoe units.

As shown in Figure 3, the winding of the electro-magnet is distinguished by the numeral 22 and the iron core pin is denoted by the numeral 23, said pin being permanently fastened at its ends 24 and 25 to the cross brace 11 and brake shoe 10 respectively. The numeral 26 merely designates a filler and 27 an aperture in the brake band to permit the head 25 to enter thereinto.

The electro-magnet is mounted at the free swingable end of the brake-shoe unit so as to provide the requisite leverage. Incidentally, in Figure 2 the current conducting wires are differentiated by the numerals 28 and these are carried to an appropriate manually regulated switch (not shown) located within convenient operating reach of the driver of the car.

The magnetic force is controlled by the number of windings of the coil 22, and the current is controlled by the switch so as to make the brake operate either rapidly or slowly according to the conditions required.

It is submitted that when the electro-magnets 21 are simultaneously energized by closing the control switch, the magnetic lines of force passing through the opening 27 of the brake band serve to attract the free swingable ends of the shoes toward and in contact with the brake drum flange whereby to provide the desired braking action. Obviously when the magnets are de-energized, the springs 15 simultaneously return the shoes to normal non-gripping position against the stop pins 19.

The gist of the invention is in the provision of a pair of duplicate diametrically opposed segmental brake shoes pivotally mounted at one end and joined together at their opposite ends through the medium of a contraction spring, together with electro-magnets carried by the shoe units and located adjacent the free swingable ends thereof, whereby to provide the requisite magnetic forces destined to overcome the tension of the spring 15 and to throw the shoes into gripping contact with the brake drum.

As before stated, the portions 10, 11, 12 and 13 as well as the fillers 26 are preferably of brass. The magnetic core pin 23 is of iron and formed with a head 25 at one end attached to the brake shoe 10 and a similar head 24 at the opposite end attached to the cross brace 11. Manifestly then, this arrangement is calculated to provide an efficient brake construction which will fulfill the requirements of a structure of this class in a highly satisfactory manner.

In practice, the supply of current may be from the ordinary storage battery, but is preferably from the generator in order to insure more dependable and steady flow of current.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

In a structure of the class described, in combination, a brake drum, a stationary axle flange, a pair of duplicate companion brake shoe units, each unit comprising a semi-circular brake shoe and bracing members therefor, the shoe and said members being of brass, the shoe being formed at one end with a bearing pivotally connected with an adjacent portion of the flange, spring means joining the free swingable ends of the shoes together, each shoe being formed with a brake lining having an aperture therein, electro-magnets permanently attached to the brake shoe units adjacent the free swingable ends thereof and in alinement with said opening, said electro-magnets being disposed in outwardly diverging relationship with respect to each other.

FORREST W. TROUP.